United States Patent [19]

Langley et al.

[11] Patent Number: 4,498,711
[45] Date of Patent: Feb. 12, 1985

[54] PNEUMATIC CONTROL FOR BRAKING SYSTEM PROVIDING SNOW BRAKE OPERATION

[75] Inventors: Keith W. Langley, Bath, England; Jack Washbourn, Frazer, Pa.

[73] Assignee: Westinghouse Brake and Signal, England

[21] Appl. No.: 439,434

[22] Filed: Nov. 5, 1982

[51] Int. Cl.³ .............................................. B60T 15/46
[52] U.S. Cl. ............................................ 303/13; 303/1
[58] Field of Search .................. 303/83, 85, 86, 1, 13, 303/15, 36, 61, 20; 188/198, 196 A, 74

[56] References Cited

U.S. PATENT DOCUMENTS

| | | | |
|---|---|---|---|
| 3,447,647 | 6/1969 | Stipanovic | 188/74 |
| 3,517,784 | 6/1970 | Clemmons | 188/196 A |
| 4,364,610 | 12/1982 | Williams | 303/20 |
| 4,367,903 | 1/1983 | Worbois | 303/86 |

Primary Examiner—Bruce H. Stoner, Jr.
Assistant Examiner—Alvin Oberley
Attorney, Agent, or Firm—Larson and Taylor

[57] ABSTRACT

A railway vehicle braking system is provided with a "snow brake" control arrangement which is used in freezing temperatures to apply a small brake force for prolonged periods to engage blocks or shoes on the vehicle wheels to reduce icing. The "snow brake" control arrangement itself includes an pneumatic valve system that includes a relay valve unit which, in a first mode, provides "snow brake" operation and, in a second mode, provides for application of brake pressure from the straight air pipe to the brake cylinders. A solenoid valve, actuated responsive to energization of a control solenoid by a snow brake control switch, controls connection of "snow brake" pressure from a supply reservoir to a control chamber of the relay valve. When the straight air pipe is pressurized responsive to call for service or emergency braking, the solenoid is de-energized and the control chamber vents to atmosphere through the solenoid valve. The relay valve provides a delay in re-energization of the solenoid, and hence in effecting reinstatement of "snow brake" operation, so that the slack adjusters can make whatever slack adjustment in the brakes that is necessary.

10 Claims, 2 Drawing Figures

PNEUMATIC CONTROL FOR BRAKING SYSTEM PROVIDING SNOW BRAKE OPERATION

FIELD OF THE INVENTION

This invention relates to railway vehicle braking systems and in particular to such systems which include a "snow brake" arrangement for maintaining a rubbing brake application under adverse winter conditions.

BACKGROUND OF THE INVENTION

It has been previous practice in railway vehicle braking systems designed for low temperature operations to provide means for maintaining a virtually continuous light rubbing brake application between the shoes of tread brakes and braked wheels of a vehicle during adverse conditions of snow or ice. Such light braking, while not producing an appreciable retarding effect on the train, generates friction and heat sufficient to reduce build-up of ice on the wheel treads and therefore to ensure more predictable service or emergency braking performance. One shortcoming of such a facility is that once actuated, normal braking during such a brake operation may result in wear on the tread brake shoes which is so excessive as to eventually prevent a subsequent full and proper brake operation. In co-pending, commonly assigned U.S. patent application Ser. No. 06/134,764 filed on Mar. 28, 1980, now U.S. Pat. No. 4,364,610 there is provided a railway vehicle braking system including "snow brake" control means for maintaining a light brake application during normal traction or coasting in order to reduce icing of wheels of a vehicle, and including override means operable from time-to-time without conscious action by a driver to override said "snow brake" means to permit complete, but temporary, brake release. The duration of this automatic, intermittent full release of the brakes is such as to afford the automatic slack adjusters provided in the system sufficient opportunity to make whatever adjustment is necessary to accommodate any detected excess of slack. Thus, by virtue of the override means, the automatic slack adjusters provided in the system are operated sufficiently frequently, and in a manner consistent with their proper operation.

SUMMARY OF THE INVENTION

In accordance with the invention, a pneumatic control system is provided which, generally speaking, affords a "snow brake" mode of operation which ensures full application of the brakes in response to a demand or call for emergency braking or the demanded application for service braking, prior to reapplication or reinstatement of the "snow brake" mode, this re-application being automatically delayed by a time period sufficent to ensure that the slack adjusters take up any excess slack in the braking system.

According to a preferred embodiment of the invention, a control system is provided for a railway vehicle braking system of the type including slack adjusters for detecting excess slack in the brakes and for adjusting the brakes in accordance therewith, and providing "snow brake" operation wherein light braking pressure is provided by the braking system responsive to the actuation of a controller for initiating such "snow brake" operation. The control system is used in controlling the initiation and termination of the "snow brake" operation and basically comprises:

control means, actuated responsive to the controller, for, when actuated, initiating "snow brake" operation;

first pneumatic valve means for controlling the braking pressure applied to the brake cylinders of the braking system and for, in a first operating mode, providing for the supply of a first, relatively low braking pressure during "snow brake" operation and for, in a second operating mode, providing for the supply of supply pipe pressure responsive to a demand for service or emergency braking; and further pneumatic valve means, responsive to the control means and operatively connected to the first valve means, for, when actuated, causing said first valve means to operate in the first operating mode thereof absent a demand for service or emergency braking;

the first valve means further comprising means associated therewith for, responsive to a demand for service or emergency braking, (1) providing for operation of the first valve means in the second mode thereof wherein supply pipe pressure is applied to the brake cylinders and (2) deactuating the control means, to thereby deactuate the further valve means, so that the first valve means no longer provides for "snow brake" operation, and for, responsive to termination of such a demand, (3) providing full release of the supply pipe pressure supplied to the brake cylinders and (4) reactuating said control means to thus reinitiate the "snow brake" operation after a time delay sufficient to enable the slack adjusters to make whatever slack adjustment is necessary to accommodate any detected excess slack.

The "means" associated with the first valve means includes a first chamber connected to receive straight air pipe pressure and a second chamber connected to the first chamber through a path providing free transfer of pressure in one direction and restricted transfer of pressure in the opposite direction. The second chamber includes actuator means responsive to pressurization and de-pressurization of the second chamber for respectively deactuating and reactuating the control means, whereby pressurization of the straight air pipe provides pressurization of the second chamber through the aforesaid path in the one direction to provide deactuation of the control means and de-pressurization of the straight pipe provides de-pressurization of the second chamber through that path in the other direction to provide re-actuation of the control means after said time delay. The control means preferably comprises a solenoid and the actuator means comprises means for breaking and re-making the connection of the solenoid to a power supply. The actuator means advantageously comprises switch contactor connected to a diaphragm whose movement is dependent on the pressure in the second chamber. The path in question preferably comprises a choke and an associated by-pass check valve.

The first valve means preferably comprises a relay valve unit including a spool member and a further brake cylinder control valve unit controlled by movement of said spool member of the relay valve unit. The brake cylinder control valve unit includes a valve member including a vent passage therein which is opened and closed responsive to the movement of the spool member and which, when open, provides venting of the brake cylinder pressure. The valve member of said control valve unit is biased so as to be normally engaged with a valve seat to provide venting of the brake cylinder pressure. An actuating movement of the spool member provides both unseating of the valve member and closing of the vent passage.

The first valve means preferably includes a control chamber the pressurization in which controls movement of the spool member thereof. This control chamber is vented to atmosphere through the further valve means when the control means (solenoid) is deactuated or de-energized, and is pressurized to the pressure in the further valve means, i.e., the "snow brake" pressure, when the control means is actuated.

The further valve means preferably comprises a solenoid-operated valve unit including a valve chamber adapted to be alternately connected to a supply reservoir and to atmosphere, and a valve member located in said valve chamber. The movement of the valve member is controlled by the solenoid and, when said solenoid is energized, provides for connection of the valve chamber to the supply reservoir, thereby connecting the supply reservoir to the control chamber of the first valve means, and thus providing the "snow brake" operation.

Other features and advantages of the present invention will be set forth in, or apparent from, the detailed description of the preferred embodiment of the invention found hereinbelow.

BRIEF DESCRIPTION OF THE DRAWINGS

In order that the invention may be more clearly understood the invention will be further described by way of example with reference to the accompanying drawings, wherein.

DESCRIPTION OF THE PREFERRED EMBODIMENTS

The railway vehicle braking apparatus under consideration is assumed to consist of electro-pneumatic braking apparatus on each car of a train, the apparatus being controlled by a driver's master controller (DMC) at one end of the train by means of control wires extending the full length of the train through inter-car couplers. The control of the braking of the train is assumed to be effected by virtue of a d.c. analog signal carried by a socalled p-wire. Typically, a current of 1 amp. in the p-wire represents full traction, a current of ½ amp, represents a coasting command and a current of zero amps. represents full braking. Graduable amounts of traction for braking are provided between the coasting and full traction or the coasting and full braking current values. The current levels are converted by a suitable decoding arrangement into a pneumatic pressure which is supplied from a local reservoir on each car to effect braking through a conventional brake cylinder with slack adjuster, and the necessary inter-connnecting rigging to tread brake units. Such systems are, of course, well known and further description is not deemed necessary apart from the cooperation thereof with the control system of the invention. Additionally, the train is provided with an arrangement which, when energized, provides a "snow brake" control for the brakes on each of the vehicles. Typically, as is discussed below, the "snow brake" apparatus may be such as to maintain a virtually continuous braking pressure of 5 to 10 p.s.i. in the brake cylinders to ensure continuous rubbing contact between the tread brakes and the wheels and thereby reduce icing of the wheels under winter conditions.

Figure 1:
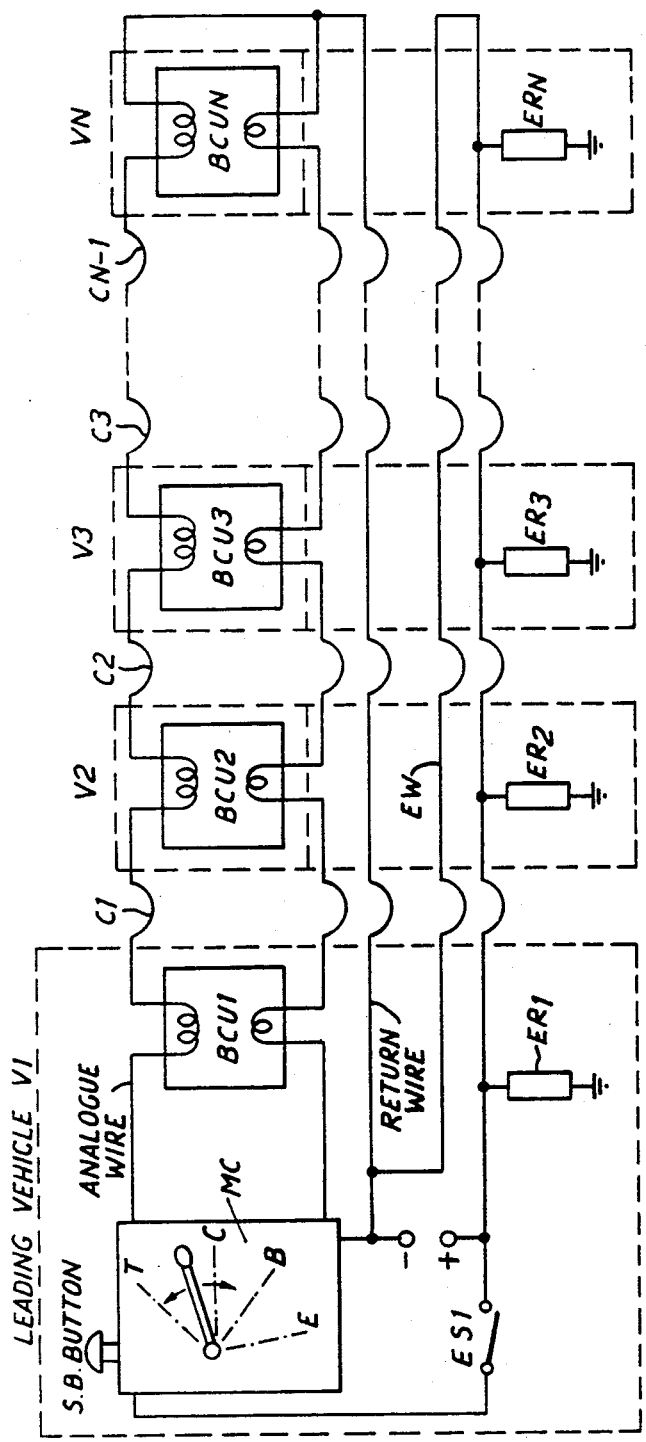
FIG. 1 illustrates, in block schematic form, relevant parts of a railway vehicle braking system in which the present invention is incorporated.

Referring to FIG. 1, there is shown in block form relevant parts of an electro-pneumatic braking system for a train of vehicles, the vehicles being denoted by references V1, V2, V3, etc., to VN. Leading vehicle V1 in the present example is a control vehicle and houses, inter alia, traction motors and a driver's position with a driver's master controller, denoted MC, provided, inter alia, with a brake and traction control handle having various positions denoted "T", "C", "B" and "E". The controller operates to provide a d.c. current analog signal in an analog wire AW connected via inter-car couplers C1, C2, C3 etc., to electronic E.P. brake control units denoted by references BCU1, BCU2 and BCUN on the respective vehicles, the control units being fed, via d.c. current transformers, with appropriate signals for controlling the brakes and traction on the respective vehicles. A return wire RW passes back to the leading vehicle V1 to form a complete current loop and it will be seen that a further emergency wire loop formed by an emergency wire EW is provided along the train.

The driver's master controller circuit is supplied through an emergency switch ES1 from the battery source of the traction vehicle V1.

As stated, an emergency loop circuit, formed by emergency wire EW, is also included and passes through the length of the train. Energization of this loop circuit maintains energization of emergency relays ER1, ER2, ER3 etc. of the control units of each of the following vehicles so that in the event of an emergency, such as a break-away, the relative supplies to these units are immediately interrupted and emergency braking ensues regardless of any other control signal which may be present. In the case of vehicle V1, contacts of relay ER1, (not shown) are included in the battery supply to the controller.

The apparatus also provides a snow brake signal described below which can be injected into the respective electronic brake control units BCU1, BCU2 etc. to call for predetermined light brake applications under coasting or traction conditions.

Referring to the operation of the arrangement of FIG. 1, the driver controls the vehicle by operation of the control handle. In order to allow the train to coast, the handle is moved to the position "C". In order to effect increasing degrees of braking, the handle is moved from the position "C" towards the position "B" beyond which a position "E" provides the driver with means for initiating emergency braking by opening emergency switch ES1 to interrupt the current supply to the controller circuit and therefor to the analog wire. The supply to the analog wire is produced by virtue of a suitable potentiometer means (not shown) in the controller to control a constant current source variable from zero amps to 1 amp through a coasting position of 0.5 amps as discussed above. In response to these currents or intermediate values within the range, the control units BCU1 to BCUN respond to control the electro-pneumatic brakes to determine the retardation of the respective cars. Although this will not be discussed, it will be understood moreover that appropriate load-weighing facilities may be provided on the respective cars to modify the braking forces produced in accordance with the loads and therefore the inherent momentum of the respective vehicles. Furthermore, the vehicles are usually provided with passenger-operable means for effecting emergency braking by interrupting the emergency wire circuit EW and thereby achieving dropout of the ER relays and interruption of the supply current to the controller, to produce emergency braking on all vehicles of the train. Similar effects are produced in the event of the train breaking in two. Operation of a "snow brake" button on the driver's brake unit in the coast "C" or any position between "C" and the traction position "T", has the effect of overriding the control of the brake control units by the analog wire and supplies a braking control current via the "snow brake" wire to the train of the order of 0.4 amps to which the brake control units respond to effect a rubbing brake application to reduce the effects of icing on the wheels.

Figure 2:
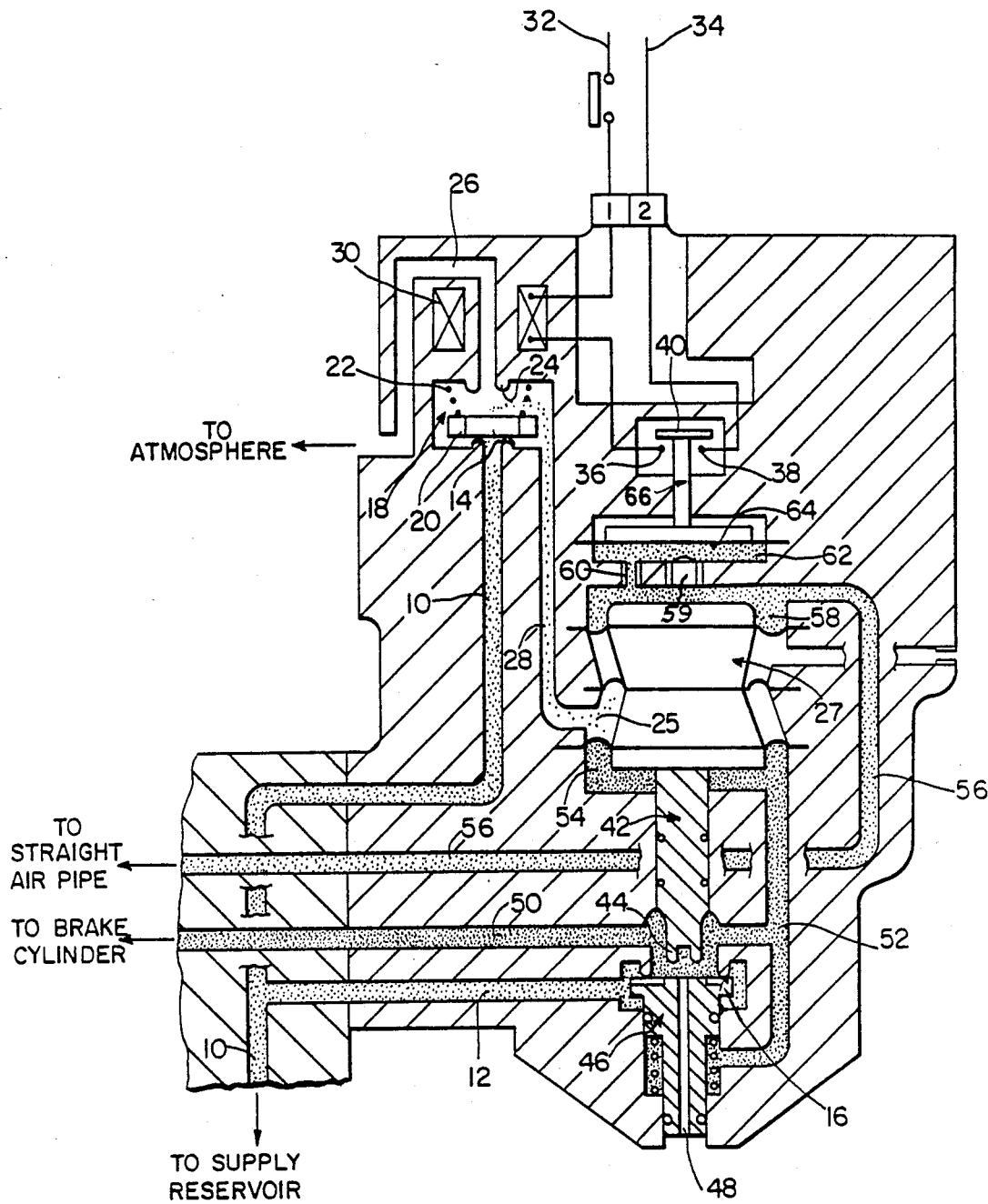
FIG. 2 is a schematic diagram of the pneumatic "snow brake" control system of the invention.

Referring to FIG. 2, an apparatus in accordance with the present invention is illustrated in the form of a pneumatic control system which provides a "snow brake" mode of operation. The system includes a pair of supply conduits 10 and 12 which are connected to a supply reservoir, as indicated, and terminate at respective valve seats 14 and 16. Valve seat 14 is part of a valve unit 18 which includes a solenoid operated valve member 20 disposed therein which is biased by a light spring 22 so that valve seat 14 is normally closed by valve member 20. Valve member 20 is movable upwardly to open the connection at valve seat 14 and close the connection at a further valve seat 24 of the valve unit 18. Valve seat 24 is connected to atmosphere through a further conduit 26 and in the normal (illustrated) position of valve member 20, a chamber 25 of a further, relay valve unit 27 described below is vented to atmosphere through a further conduit 28, valve seat 24 and conduit 26.

Valve member 20 is operated by a solenoid 30 connected in series with a simple pushbutton "snow brake" switch (not shown) over conductors 32 and 34. Switch contacts 36 and 38 are connected in series with solenoid 30 and are normally closed by a switch contactor 40. Thus, when the "snow brake" circuit is completed by actuation of the "snow brake" switch referred to above, solenoid 30 is energized, valve member 20 is lifted from seat 16 and moved to seat against seat 24. Under these conditions, the connection of valve chamber 25 to atmosphere is closed and the connection of this chamber to conduit 10 is opened so that supply reservoir pressure is applied over conduits 10 and 28 to chamber 25. The above-mentioned relay valve unit 27 includes a valve spool 42 which is movable responsive to pressurization of valve chamber 25 and includes a valve seat 44 at the lower end thereof. Movement of valve spool 42 controls movement of a further valve member 46 associated with valve seat 16 referred to above, as well as opening and closing of a vent passage 48 extending longitudinally of valve member 46. Thus, upon pressurization of chamber 25 under the circumstances described above (viz., energization of solenoid 30 and consequent lifting of valve member 20 from seat 14), relay valve spool 42 is caused to move downwardly, to first cause seat 44 to engage the upper surface of valve member 46 and thus close off vent passage 48, and to thereafter, through the continued movement thereof, cause movement of valve member 46 so as to provide unseating of valve member 46 from seat 16. Under these conditions, supply reservoir pressure supplied at seat 16 from conduit 12 will be connected to a pair of conduits 50 and 52 which are normally closed off by valve member 46 when seated on seat 16.

Conduit 50 is connected to the brake cylinders, as indicated, and thus pressure from supply reservoir is fed to the brake cylinder at this stage.

Conduit 52 is connected to a chamber 54 located under relay valve spool 42, as illustrated. Chamber 54 functions to "lapp-off" relay valve unit 27. In this regard, when the pressure in chamber 54, which is the same as that in the brake cylinders, reaches a fairly low value (about 4 to 5 pounds per square inch in a specific example), the pressure chamber 54 balances off the pressure in chamber 25 and thus a sufficient pressure is maintained in the brake cylinder to merely hold the brake blocks in light engagement with the wheel tread.

Considering further the overall operation of the system of FIG. 2, if, during the "snow brake" mode, a conventional brake application (whether emergency or service) is called for, air pressure to the degree required to effect the level of braking called for will appear, through conventional brake-application/release valves (not shown), in the straight air pipe to which a conduit 56 is connected, as indicated. Conduit 56 is also connected to a chamber 58 located above relay spool valve 42 and, when air pressure appears in conduit 56, this pressure will also be immediately experienced in chamber 58 and equal rapidly, through a one-way check valve 59, in a further chamber 62 located under a diaphram 64. A choke 60, which performs a function described below, is also connected between chamber 58 and chamber 62. An actuator 66 for the switch contactor 40 described above engages diaphram 64 and hence, when chamber 62 is pressurized, diaphram 64, and thus switch contactor 40, will be moved rapidly upwardly to break the connection between contacts 36 and 38 and thereby de-energize solenoid 30. It will be seen that de-energization of solenoid 30 restores the connection of chamber 25 to atmosphere through conduit 28, valve seat 24 and conduit 26 in that valve member 20 is reseated on seat 14 under these circumstances. Further, the opposing forces on relay valve spool 42 are now those produced by the pressures in upper chamber 58 and lower chamber 54 so that relay valve spool 42 will move to balance the pressure in the brake cylinder and, therefore, in chamber 54 with the straight air pipe pressure in chamber 58. With the removal of the supply reservoir pressure from chamber 25, the applied brake pressure is thus truly reflective of the pressure called for over the straight air pipe and is not affected by the fact of the system being set for the "snow brake" mode operation which, as explained above, would normally provide for a pressure of four to five pounds per square inch in the brake cylinder.

The conventional brake application considered above is released by de-pressurization of the straight air pipe and restoration of the pressure therein to atmospheric pressure. This results in de-pressurization of chamber 58 and the consequential lifting of the relay valve spool 42 by the brake cylinder pressure in chamber 54. This movement of spool 42 provides unseating of associated valve seat 44 from the upper surface of valve member 46 and thus permits valve member 46 to firmly re-engage valve seat 16. Under these circumstances, the brake cylinder pressure will vent to atmosphere through conduit 50 and vent passage 48.

It will be understood that the pressure in chamber 62 will also be vented at this time, but venting of chamber 62 will take place slowly in that by-pass check valve 59 does not permit air to return through that route and choke 60 permits the air in chamber 62 to escape relatively slowly. This restriction in the rate of escape of pressure from chamber 62 provides a delay in remaining of the connection between contactor 40 and switch contacts 36, 38. This means that the light "snow brake" application is not restored until after the brakes have been fully released, thereby ensuring operation of the associated slack adjuster to provide adjustment for any excess slack which might be present. Contactor 40 and associated operating diaphram 64 are constructed such that the connection with contacts 38, 40 will be broken and will remain broken so long as a pressure of in excess of about 2 pounds per square inch is present in chamber 62. It is noted that most of the wear of the brake blocks arises from service and/or emergency brake applications. Thus, if provision is made for fully releasing the brakes after every service or emergency application (by providing full release of the brakes prior to re-establishment of the "snow brake" mode of operation), there will generally be sufficient brake operation to ensure that excess slack is taken up by the slack adjusters, in exactly the same way as a conventional braking system without "snow brake" operation.

Although the invention has been described in detail with respect to an exemplary embodiment thereof, it will be understood by those of ordinary skill in the art that variations and modifications may be effected in this embodiment within the scope and spirit of the invention.

We claim:

1. In a railway vehicle braking system of the type providing "snow brake" operation wherein light braking pressure is provided by the braking system responsive to the actuation of a controller for initiating such "snow brake" operation, a control system for controlling the initiation and termination of the "snow brake" operation comprising:

control means, actuated in response to said controller, for, when actuated, initiating "snow brake" operation;

first pneumatic valve means for controlling the braking pressure applied to the brake cylinders of the braking system and for, in a first operating mode, providing for the supply of a first, relatively low braking pressure during "snow brake" operation and for, in a second operating mode, providing for the supply of supply pipe pressure responsive to a demand for service or emergency braking; and further pneumatic valve means, responsive to said control means and operatively connected to the first valve means, for, when actuated, causing said first valve means to operate in the first operating mode thereof absent a demand for service or emergency braking;

said first valve means further comprising means associated therewith for, responsive to a demand for service or emergency braking, (1) providing for operaion of said first valve means in the second mode thereof wherein supply pipe pressure is supplied to the brake cylinders and (2) deactuating said control means to thereby deactuate said further valve means so that the first valve means no longer provides for "snow brake" operation, and for, responsive to termination of such a demand, (3) providing full release of the pressure supplied to the brake cylinders and (4) reactuating said control means to thus reinitiate the "snow brake" operation after a predetermined time delay the means associated with said first valve means including a first chamber connected to receive straight air pipe pressure and a second chamber connected to said first chamber through a path providing free transfer of pressure in one direction and restricted transfer of pressure in the opposite direction, said second chamber including actuator means responsive to pressurization and de-pressurization of said second chamber for respectively deactuating and reactuating said control means whereby pressurization of the straight air pipe provides pressurization of said second chamber through said path in said one direction to provide deactuation of said control means and de-pressurization of the straight air pipe provides de-pressurization of said second chamber through said path in said other direction-to provide reactuation of said control means after said time delay.

2. A railway braking system as claimed in claim 1 wherein said control means comprsies a solenoid and said actuator means comprises means for braking and re-making the connection of said solenoid to a power supply.

3. A railway braking system as claimed in claim 2 wherein said actuator means comprises a switch contactor connected to a diaphram whose movement is dependent on the pressure in said second chamber.

4. A railway braking system as claimed in claim 1 or claim 2 wherein said path comprises a choke and an associated by-pass check balve connected in parallel therewith.

5. A railway braking system as claimed in claim 1 wherein said control means comprises a solenoid and wherein said further valve means includes a valve chamber alternately connected to a supply reservoir and to atmosphere, and a valve member, located in said valve chamber, the movement of which is controlled by said solenoid and which, when said solenoid is energized, provides for connection of said valve chamber to the supply reservoir, thereby connecting the supply reservoir to the control chamber of the first valve means.

6. In a railway vehicle braking system of the type providing "snow brake" operation wherein light braking pressure is provided by the braking system responsive to the actuation of a controller for initiating such "snow brake" operation, a control system for controlling the initiation and termination of the "snow brake" operation comprising:

control means, actuated in response to said controller, for, when actuated, initiating "snow brake" operation;

first pneumatic valve means for controlling the braking pressure applied to the brake cylindrs of the braking system and for, in a first operating mode, providing for the supply of a first, relatively low braking pressure during "snow brake" operation and for, in a second operating mode, providing for the supply of supply pipe pressure responsive to a demand for service or emergency braking; and further pneumatic valve means, responsive to said control means and operatively connected to the first valve means, for, when actuated, causing said first valve means to operate in the first operating mode thereof absent a demand for service or emergency braking, said further valve means being connected to a supply reservoir presure and, when actuated, providing communication of the full supply reservoir pressure to said first valve means;

said first valve means further comprising means associated therewith for, responsive to a demand for service or emergency braking, (1) providing for opeation of said first valve means in the second mode thereof wherein supply pipe pressure is supplied to the brake cylinders and (2) deactuating said control means to thereby deactuate said further valve means so that the first valve means no longer provides for "snow brake" operation, and for, responsive to termination of such a demand, (3) providing full release of the pressure supplied to the brake cylinders and (4) reactuating said control means to thus reinitiate the "snow brake" operation after a predetermined time delay, said first valve means comprising a relay valve unit including a spool member and further brake cylinder control valve unit controlled by movement of said spool member of said relay valve unit, said relay valve unit further including a control chamber the pressurization of which controls movement of the spool member, said control chamber being vented through said further valve means when said control means is deactuated and being pressurized to the full supply reservoir pressure when said control means is actuated.

7. A railway braking system as claimed in claim 6 wherein said brake cylinder control valve unit includes a valve member including a vent passage therein which is opened and closed responsive to the movement of said spool member and which, when open, provides venting of the brake cylinder pressure.

8. A railway braking system as claimed in claim 7 wherein said valve member of said control valve unit is biased so as to be normally engaged with a valve seat to provide venting of the brake cylinder pressure and wherein an actuating movement of said spool member provides both unseating of said valve member and closing of said vent passage.

9. A railway braking system as claimed in claim 6 therein said relay valve unit further comprises a further chamber connected to the brake cylinder supply line and an additional chamber connected to receive straight air pressure.

10. A railway braking system as claimed in claim 6 wherein said control means comprises a solenoid and said actuator comprises means for breaking and re-making the connection of said solenoid to a power supply, said actuator means comprising a switch contactor connected to a diaphram the movement of which is directly dependent upon the straight air pressure.

* * * * *